(12) United States Patent
Sun et al.

(10) Patent No.: US 12,353,952 B2
(45) Date of Patent: Jul. 8, 2025

(54) SYSTEMS AND METHODS FOR PREPARATION OF NORMAL DISTRIBUTIONS ON QUANTUM COMPUTERS

(71) Applicant: JPMORGAN CHASE BANK, N.A., New York, NY (US)

(72) Inventors: Yue Sun, Short Hills, NJ (US); Marco Pistoia, Amawalk, NY (US); Pierre Minssen, New York, NY (US); Arthur G. Rattew, Sag Harbor, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1058 days.

(21) Appl. No.: 17/337,831

(22) Filed: Jun. 3, 2021

(65) Prior Publication Data

US 2022/0391468 A1  Dec. 8, 2022

(51) Int. Cl.
*G06N 10/60* (2022.01)
*G06N 10/00* (2022.01)

(52) U.S. Cl.
CPC ............ *G06N 10/00* (2019.01); *G06N 10/60* (2022.01)

(58) Field of Classification Search
None
See application file for complete search history.

(56) References Cited

U.S. PATENT DOCUMENTS

| | | | | |
|---|---|---|---|---|
| 2014/0297708 | A1* | 10/2014 | Svore | G06F 17/10 |
| | | | | 708/517 |
| 2018/0232649 | A1* | 8/2018 | Wiebe | G06F 17/16 |
| 2019/0019102 | A1* | 1/2019 | Babbush | G06N 10/20 |
| 2021/0312313 | A1* | 10/2021 | Woerner | G06N 7/01 |
| 2023/0114370 | A1* | 4/2023 | Akhalwaya | G06F 17/18 |
| | | | | 257/191 |

\* cited by examiner

*Primary Examiner* — Xuyang Xia
(74) *Attorney, Agent, or Firm* — GREENBERG TRAURIG LLP

(57) ABSTRACT

A quantum computer program may receive a mean, a standard deviation, and a discretization for a target normal distribution; determine a number of iterations t based on the mean and standard deviation; identify a value n from the discretization and value $X_0$ from the mean; initialize n qubits in register q and an ancilla; apply a quantum Fourier transform and a $+X_0$ gate to q; apply a Y-Rotation with angle $\pi/2$ to the ancilla; apply a controlled +1 gate to q controlled by the ancilla; apply a Hadamard gate to the ancilla; measure the ancilla; set a value C to a value of the measured ancilla; repeat from the Y-Rotation t times; apply an inverse quantum Fourier transform to q; and output amplitudes of basis states of q as the normal distribution. The program may use qubit-scaling to reduce the number of iterations needed.

12 Claims, 4 Drawing Sheets

SYSTEMS AND METHODS FOR PREPARATION OF NORMAL DISTRIBUTIONS ON QUANTUM COMPUTERS

BACKGROUND OF THE INVENTION

1. Field of the Invention

Embodiments are generally directed to systems and methods for preparation of normal distributions on quantum computers.

2. Description of the Related Art

The efficient preparation of input distributions is particularly important for a wide range of quantum algorithms, such as those for amplitude estimation, option pricing, principal-component analysis, matrix inversion, and machine learning, which all offer the potential for quantum advantage so long as their initial distributions may be generated without introducing computational bottlenecks.

SUMMARY OF THE INVENTION

Systems and methods for preparation of normal distributions on quantum computers are disclosed. In one embodiment, a method for preparation of normal distributions on a quantum computer, comprising: (1) receiving, at a quantum computer program, a mean, a standard deviation, and a discretization for a target normal distribution; (2) determining, by the quantum computer program, a number of iterations $t_1, t_2, \ldots t_m$ based on the mean and the standard deviation; (3) identifying, by the quantum computer program, a value n from the discretization; (4) setting, by the quantum computer program, n qubits in a register q; (5) identifying, by the quantum computer program, a value $X_0$ from the mean; (6) initializing, by the quantum computer program, a state of a plurality of qubits in the register q and a state of an ancilla qubit to $|0\rangle$; (7) applying, by the quantum computer program, a first Hadamard gate to the qubits in the register q; (8) applying, by the quantum computer program, a quantum Fourier transform to the register q; (9) applying, by the quantum computer program, a $+X_0$ gate to the register q; (10) setting, by the quantum computer program, a value j to 1; (11) applying, by the quantum computer program, a Y-Rotation operation with an angle $\pi/2$ to the ancilla qubit; (12) applying, by the quantum computer program, a controlled +1 gate to the register q controlled by the ancilla qubit; (13) applying, by the quantum computer program, a second Hadamard gate to the ancilla qubit; (14) measuring, by the quantum computer program, the ancilla qubit; (15) setting, by the quantum computer program, a value $C_j$ to a value of the measured ancilla qubit; (16) applying, by the quantum computer program, an inverse quantum Fourier transform to the register q; and (17) outputting, by the quantum computer program, a normal distribution, wherein the normal distribution comprises amplitudes of basis states of the qubits in the register q.

In one embodiment, the state of the register q may be $$\cos\theta|x\rangle|0\rangle + \sin\theta|x\rangle|1\rangle$$

where $|x\rangle$ is the state of the register q after the Y-Rotation operation.

In one embodiment, wherein the state of the register q and the ancilla qubit may be:

$$\cos\theta|x\rangle|0\rangle + \sin\theta|x+1\rangle|1\rangle$$

after the application of the controlled +1 gate.

In one embodiment, the state of the register q and the ancilla qubit may be:

$$\frac{1}{\sqrt{2}}(\cos\theta|x\rangle|0\rangle + \sin\theta|x+1\rangle|0\rangle) + \frac{1}{\sqrt{2}}(\cos\theta|x\rangle|1\rangle - \sin\theta|x+1\rangle|1\rangle)$$

after the application of the first Hadamard gate.

In one embodiment, the steps of applying the Y-Rotation operation with the angle $\pi/2$ to the ancilla qubit, applying the controlled +1 gate to the register q controlled by the ancilla qubit, applying the second Hadamard gate to the ancilla qubit, and measuring the ancilla qubit may be repeated t times.

In one embodiment, the qubits in the register q may be post-selected based on a value of $C_1, C_2, \ldots C_t$.

According to another embodiment, a method for preparation of normal distributions on a quantum computer may include: (1) receiving, at a quantum computer program, a mean, a standard deviation, and a discretization for a target normal distribution; (2) determining, by the quantum computer program, a number of iterations $t_1, t_2, \ldots t_m$, based on the mean and the standard deviation; (3) identifying, by the quantum computer program, a value m and a value $n_1$ from the discretization; (4) setting, by the quantum computer program, m−1 qubits in a register $q_1$ and $n_1$ qubits in a register $q_2$; (5) identifying, by the quantum computer program, a value $X_0$ from the mean; (6) initializing, by the quantum computer program, a state of a plurality of output qubits in register $q_1$ and the register $q_2$ and a state of an ancilla qubit to $|0\rangle$; (7) applying, by the quantum computer program, a first Hadamard gate to each qubit in the register $q_1$; (8) applying, by the quantum computer program, a quantum Fourier transform to the register $q_1$ and the register $q_2$; (9) applying, by the quantum computer program, a $+X_0$ gate to the register $q_1$ and the register $q_2$; (10) setting, by the quantum computer program, a value i to 1 and a value j to 1; (11) applying, by the quantum computer program, a Y-Rotation operation with an angle $\pi/2$ to the ancilla qubit; (12) applying, by the quantum computer program, a controlled $+2^{m-1}$ gate to the register $q_1$ and the register $q_2$ controlled by the ancilla qubit; (13) applying, by the quantum computer program, a second Hadamard gate may to the ancilla qubit; (14) measuring, by the quantum computer program, the ancilla qubit; (15) setting, by the quantum computer program, a value $C_j$ to a value of the measured ancilla qubit; (16) increasing, by the quantum computer program, the value j by 1; (17) applying, by the quantum computer program, an inverse quantum Fourier transform to the register $q_1$ and the register $q_2$; and (18) outputting, by the quantum computer program, a normal distribution, wherein the normal distribution comprises amplitudes of basis states of the qubits in the register $q_1$ and the register $q_2$.

In one embodiment, the state of the register $q_1$ and the register $q_2$ may be:

$$\cos\theta|x\rangle|0\rangle + \sin\theta|x\rangle|1\rangle$$

where $|x\rangle$ is the state of the register q after the Y-Rotation operation.

In one embodiment, the state of the register $q_1$, the register $q_2$, and the ancilla qubit may be:

$$\cos\theta|x\rangle|0\rangle+\sin\theta|x+1\rangle|1\rangle$$

after the application of the controlled +1 gate.

In one embodiment, the state of the register $q_1$, the register $q_2$, and the ancilla qubit may be:

$$\frac{1}{\sqrt{2}}(\cos\theta|x\rangle|0\rangle+\sin\theta|x+1\rangle|0\rangle)+\frac{1}{\sqrt{2}}(\cos\theta|x\rangle|1\rangle-\sin\theta|x+1\rangle|1\rangle)$$

after the application of the first Hadamard gate.

In one embodiment, the steps of applying the Y-Rotation operation with the angle $\pi/2$ to the ancilla qubit, applying the controlled $+2^{m-1}$ gate to the register $q_1$ and the register $q_2$ controlled by the ancilla qubit, applying the second Hadamard gate to the ancilla qubit, and measuring the ancilla qubit may be repeated $t_i$ times.

In one embodiment, the steps of applying the Y-Rotation operation with the angle $\pi/2$ to the ancilla qubit, applying the controlled $+2^{m-1}$ gate to the register $q_1$ and the register $q_2$ controlled by the ancilla qubit, applying the second Hadamard gate to the ancilla qubit, and measuring the ancilla qubit may be repeated i times.

In one embodiment, the qubits in the register $q_1$ and the register $q_2$ may be post-selected based on a value of $C_1$, $C_2$, ... $C_r$, wherein $t=t_1+t_2+\ldots+t_m$.

According to another embodiment, a system may include a quantum computer and a classical computer comprising a processor and a memory, wherein the classical computer causes the quantum computer to: receive a mean, a standard deviation, and a discretization for a target normal distribution; determine a number of iterations $t_1, t_2, \ldots t_m$ based on the mean and the standard deviation; identify a value n from the discretization; set n qubits in a register q; identify a value $X_0$ from the mean; initialize a state of a plurality of qubits in the register q and a state of an ancilla qubit to $|0\rangle$; apply a first Hadamard gate to the qubits in the register q; apply a quantum Fourier transform to the register q; apply a $+X_0$ gate to the register q; set a value j to 1; apply a Y-Rotation operation with an angle $\pi/2$ to the ancilla qubit; apply a controlled +1 gate to the register q controlled by the ancilla qubit; apply a second Hadamard gate to the ancilla qubit; measure the ancilla qubit; set a value $C_j$ to a value of the measured ancilla qubit; apply an inverse quantum Fourier transform to the register q; and output a normal distribution, wherein the normal distribution comprises amplitudes of basis states of the qubits in the register q.

In one embodiment, the state of the register q may be:

$$\cos\theta|X\rangle|0\rangle+\sin\theta|X\rangle|1\rangle$$

where $|x\rangle$ is the state of the register q after the Y-Rotation operation.

In one embodiment, the state of the register q and the ancilla qubit may be:

$$\cos\theta|x\rangle|0\rangle+\sin\theta|x+1\rangle|1\rangle$$

after the application of the controlled +1 gate.

In one embodiment, the state of the register q and the ancilla qubit may be:

$$\frac{1}{\sqrt{2}}(\cos\theta|x\rangle|0\rangle+\sin\theta|x+1\rangle|0\rangle)+\frac{1}{\sqrt{2}}(\cos\theta|x\rangle|1\rangle-\sin\theta|x+1\rangle|1\rangle)$$

after the application of the first Hadamard gate.

In one embodiment, applying the Y-Rotation operation with the angle $\pi/2$ to the ancilla qubit, applying the controlled +1 gate to the register q controlled by the ancilla qubit, applying the second Hadamard gate to the ancilla qubit, and measuring the ancilla qubit may be repeated t times.

In one embodiment, the qubits in the register q may be post-selected based on a value of $C_1, C_2, \ldots C_r$.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and methods for preparation of normal distributions on quantum computers are disclosed.

The disclosure of Rattew et al, "Quantum Simulation of Galton Machines Using Mid-Circuit Measurement and Reuse," arXiv:2009.06601 (September 2020) is incorporated, by reference, in its entirety.

Embodiments may provide at least some of the following: (1) an algorithm for both the exact and approximate simulation of Galton machines, the latter of which runs with $O(n^2)$ circuit depth (with n being the number of qubits in the output quantum register) and requires only a single ancilla, or with $O(n \log n)$ circuit depth and $O(n)$ ancilla qubits; (1) the efficient generation of normal distributions in quantum registers, with the only source of error (from the central limit theorem approximation) vanishing exponentially in the number of qubits; (3) the use of Mid-Circuit Measurement and Reuse (MCMR) using a RUS scheme combined with MCMR, with an $O(1)$ expected rate of success; and (4) theoretical error detection and mitigation using only one ancillary qubit.

In embodiments a normal distribution may be generated using a Galton machine, which may be described by the transition matrix H as:

$$H|x\rangle=|x-1\rangle+|x+1\rangle+$$

Applying $H^t$ to an initial quantum state produces a normal distribution (on the amplitudes) equivalent to that produced by a classical Galton machine with t rows of deflecting pegs. As such, the mean of the produced distribution is given by $\mu=t/2$, while the standard deviation is given by $$\sigma = \frac{1}{2}\sqrt{t}.$$

Figure 1:
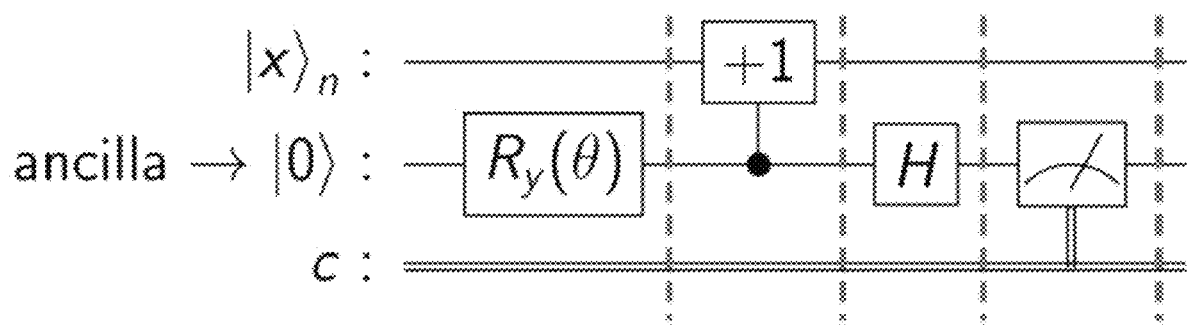
FIG. 1 depicts an exemplary Quantum Galton machine according to an embodiment.

An example of a H is provided in FIG. 1.

Figure 2:
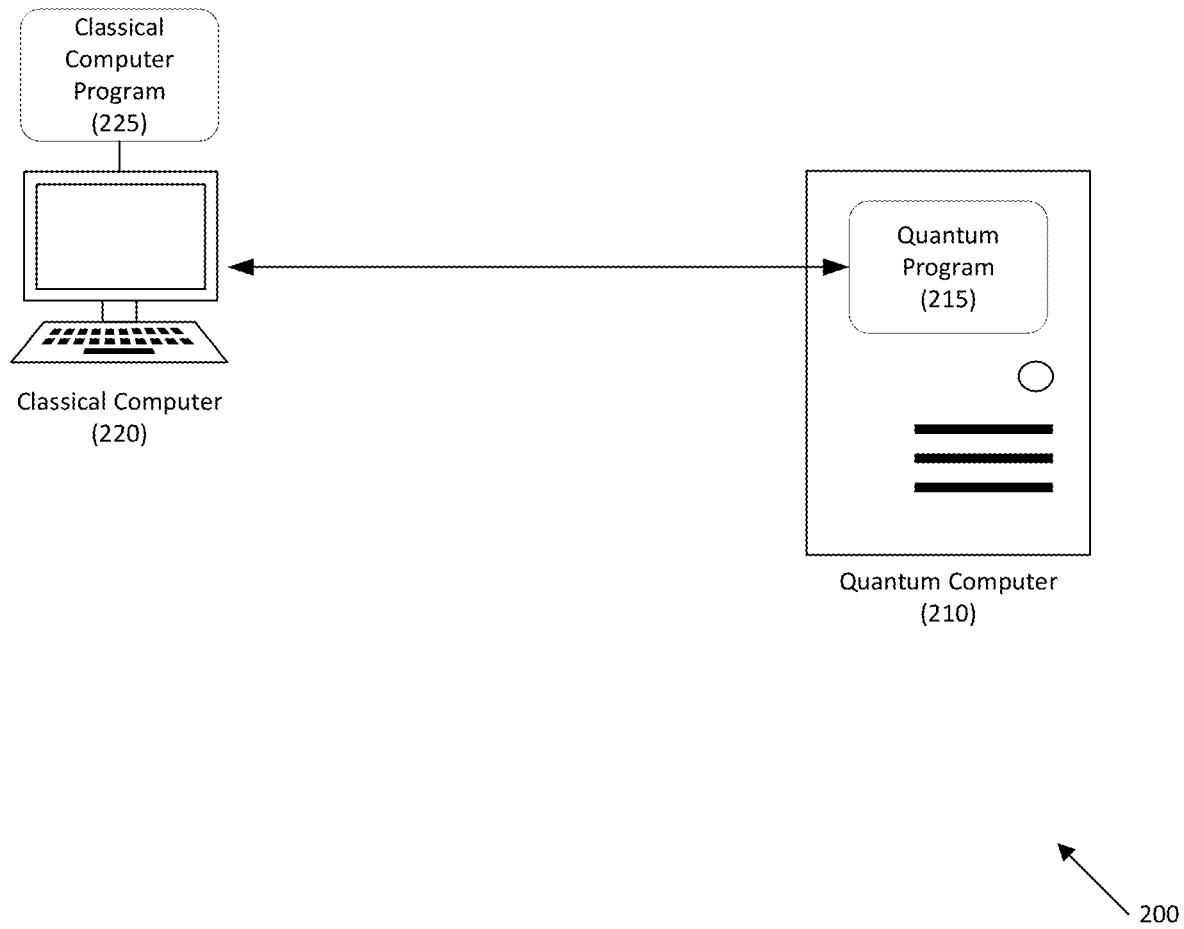
FIG. 2 depicts a system for preparation of normal distributions on quantum computers according to an embodiment.

Referring to FIG. 2, a system for preparation of normal distributions on quantum computers is disclosed according to an embodiment. System 200 may include quantum computer 210 that may execute quantum program 215. Classical computer 220 may execute classical computer program 225 and may interface with quantum program 215.

Figure 3:
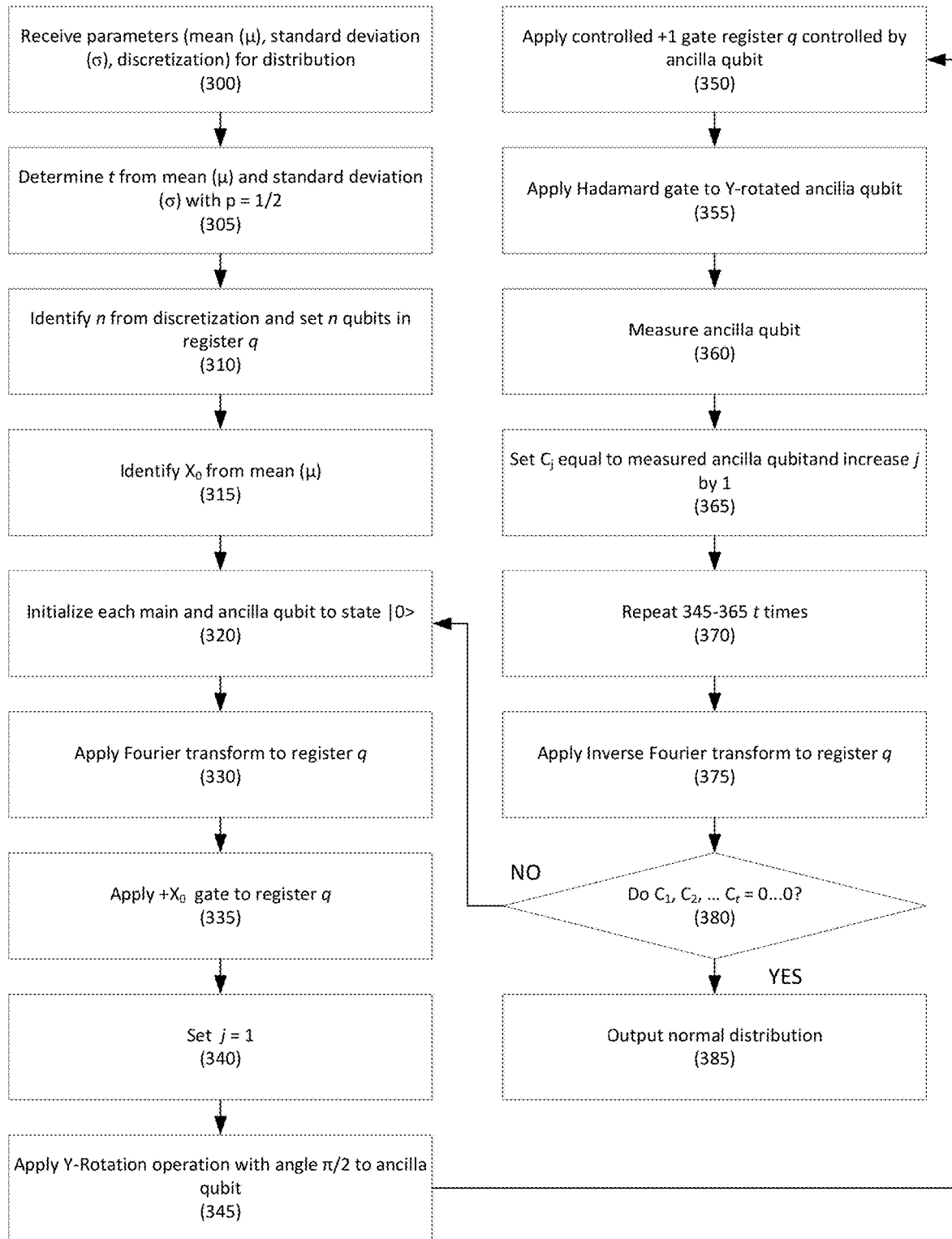
FIG. 3 depicts a method for preparation of normal distributions without using qubit scaling on quantum computers according to an embodiment.

According to an embodiment, qubit scaling may not be used. For example, referring to FIG. 3, a schematic of a Galton machine without qubit scaling is provided according to one embodiment. In one embodiment, a classical computer may generate a quantum computer program that may cause the quantum computer to execute certain instructions.

In step 300, parameters may be received. For example, the parameters may include the mean (i.e., μ), standard deviation (i.e., σ), discretization, etc. for the target normal distribution.

In step 305, a number of iterations t from the mean and the standard deviation for the target normal distribution with p=1/2 may be determined. For example, the following equations may be used:

$$t = \frac{4N^2}{l^2}\hat{\sigma}^2.$$

In step 310, n may be identified from the discretization, n qubits may be set in register q.

In step 315, $X_0$ may be identified from the mean (μ).

In step 320, the state of each qubit in register q and the ancilla qubit may be initialized to |0>.

In step 330, a quantum Fourier transform may be applied to register q.

In step 335, a +$X_0$ gate may be applied to register q.

In step 340, j may be set to 1.

In step 345, a Y-Rotation operation with angle π/2 may be applied to the ancilla qubit. After the operation, the state of the register becomes:

cos θ|x>|0>+sin θ|x>|1| where |x> is the state of the register q.

In step 350, a controlled +1 gate may be applied to register q controlled by the ancilla. After the operation, the state of register q and the ancilla becomes:

cos θ|x>|0>+sin θ|x+1>|1>

In step 355, a Hadamard gate may be applied to the Y-rotated ancilla. After the operation, the state of register q and the ancilla becomes:

$$\frac{1}{\sqrt{2}}(\cos\theta|x\rangle|0\rangle+\sin\theta|x+1\rangle|0\rangle)+\frac{1}{\sqrt{2}}(\cos\theta|x\rangle|1\rangle-\sin\theta|x+1\rangle|1\rangle)$$

In step 360, the ancilla may be measured. If the measured value of the ancilla is 0, this indicates a successful application of the controlled +1 operation. If the measured value of the ancilla is 1, this indicates an unsuccessful application of the function.

In step 365, $C_1$ may be set to be equal to the measured value of the ancilla, and j may be increased by 1.

In step 370, steps 345-365 may be repeated t times.

In step 375, an inverse quantum Fourier transform may be applied to register q.

In step 380, if $C_1, C_2, \ldots C_t$ are all equal to zero, in step 385, the normal distribution may be output. In one embodiment, the output distribution may be given by the amplitudes of the basis states constituting the state of all the qubits in register q.

If $C_1, C_2, \ldots C_t$ are not all equal to zero, the process may return to step 320.

Figure 4:
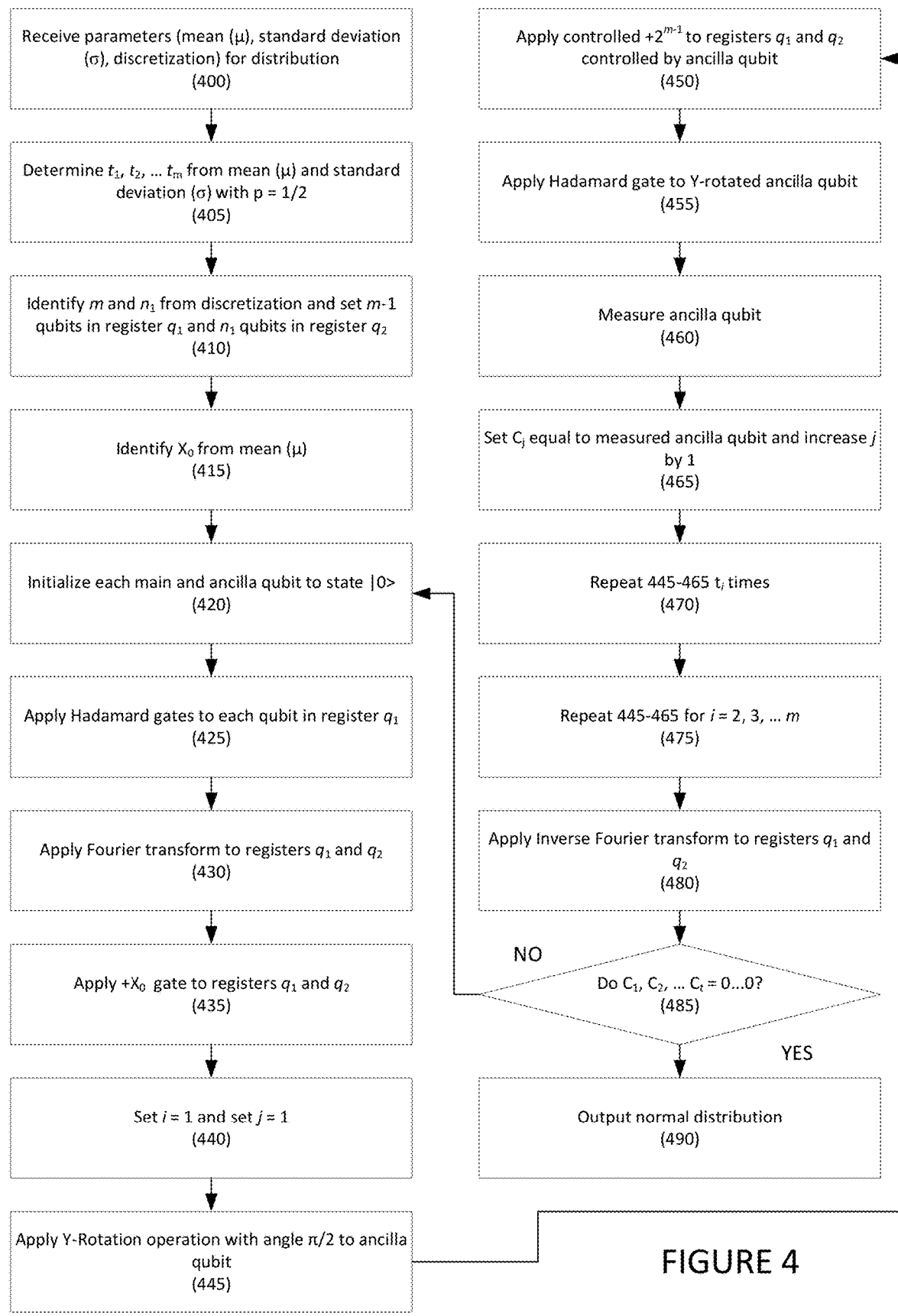
FIG. 4 depicts a method for preparation of normal distributions using qubit scaling on quantum computers according to an embodiment.

Referring to FIG. 4, a method for preparation of normal distributions on quantum computers is disclosed according to an embodiment. The embodiment of FIG. 4 may use qubit scaling, which may achieve the complexities described above. In one embodiment, a classical computer may generate a quantum computer program that may cause the quantum computer to execute certain instructions.

In one embodiment, the transition matrix, H, may be used.

In step 400, parameters may be received. For example, the parameters may include the mean (i.e., μ), standard deviation (i.e., σ), discretization, etc. for the target normal distribution.

In step 405, a number of iterations, $t_1, t_2, \ldots t_m$, from the mean and the standard deviation for the target normal distribution with p=1/2 may be determined. For example, the following equations may be used:

$$\mu_i^{2'} = \mu_i + t_i p = 2\mu_{i-1} + 0.5 + t_i p,$$

$$\sigma_i^{2'} = \sigma_i + \mu_i^{2'}(1-p) = 4\sigma_{i-1}^2 + 0.25 + \mu_i^{2'}(1-p),$$

$$\mu_i^{2'} = 0.5 \times (2^{i-1} - 1) + \sum_{k=1}^{i} 2^{i-k} pt_k,$$

$$\sigma_i^{2'} = 0.25 \times \frac{4^{i-1}-1}{3} + \sum_{k=1}^{i} 4^{i-k} p(1-p)t_k$$

In step 410, m and $n_1$ may be identified from the discretization, and m−1 qubits in register $q_1$ and $n_1$ qubits in register $q_2$ may be set.

In step 415, $X_0$ may be identified from the mean (μ).

In step 420, the state of each qubit in register $q_1$ and the register $q_2$ and the ancilla qubit may be initialized to |0>.

In step 425, Hadamard gates may be applied to each qubit in register $q_1$.

In step 430, a quantum Fourier transform may be applied to registers $q_1$ and $q_2$.

In step 435, a +$X_0$ gate may be applied to registers $q_1$ and $q_2$.

In step 440, i may be set to 1 and j may be set to 1.

In step 445, a Y-Rotation operation with angle π/2 may be applied to the ancilla qubit. After the operation, the state of the register becomes:

cos θ|x>|0>+sin θ|x>|1| where |x> is the state of the registers $q_1$ and $q_2$.

In step 450, a controlled +$2^{m-1}$ gate may be applied to registers $q_1$ and $q_2$ controlled by the ancilla. After the operation, the state of the registers $q_1$ and $q_2$ and the ancilla becomes:

cos θ|x>|0>+sin θ|x+1>|1>

In step 455, a Hadamard gate may be applied to the Y-rotated ancilla. After the operation, After the operation, the state of the registers $q_1$ and $q_2$ and the ancilla becomes:

$$\frac{1}{\sqrt{2}}(\cos\theta|x\rangle|0\rangle+\sin\theta|x+1\rangle|0\rangle)+\frac{1}{\sqrt{2}}(\cos\theta|x\rangle|1\rangle-\sin\theta|x+1\rangle|1\rangle)$$

In step 460, the ancilla may be measured. If the measured value of the ancilla is 0, this indicates a successful application of the controlled +1 operation. If the measured value of the ancilla is 1, this indicates an unsuccessful application of the function.

In step 465, $C_1$ may be set to be equal to the measured value of the ancilla. j may be increased by 1.

In step 470, steps 435-455 may be repeated $t_i$ times.

In step 475, steps 435-460 may be repeated for i=2, 3, . . . m.

In step 480, an inverse quantum Fourier transform may be applied to registers $q_1$ and $q_2$.

In step 485, if $C_1, C_2, \ldots C_t$ are all equal to zero, where $t=t_1+t_2+ \ldots +t_m$, in step 490, the normal distribution may be output. In one embodiment, the output distribution may be given by the amplitudes of the basis states constituting the state of all of the qubits in register $q_1$ and register $q_2$.

If $C_1, C_2, \ldots C_t$ are not all equal to zero, the process may return to step 420.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for preparation of normal distributions on a quantum computer, comprising:

receiving, at a quantum computer program, a mean, a standard deviation, and a discretization;

determining, by the quantum computer program, a number of iterations based on the mean and the standard deviation;

identifying, by the quantum computer program, a first value from the discretization;

setting, by the quantum computer program, a plurality of qubits in a register equal to the first value;

identifying, by the quantum computer program, a value $X_0$ from the mean;

initializing, by the quantum computer program, a state of the plurality of qubits in the register and a state of an ancilla qubit to $|0>$;

applying, by the quantum computer program, a first Hadamard gate to the plurality of qubits in the register;

applying, by the quantum computer program, a quantum Fourier transform to the register;

applying, by the quantum computer program, a $+X_0$ gate to the register;

applying, by the quantum computer program, a Y-Rotation operation with an angle $\pi/2$ to the ancilla qubit;

applying, by the quantum computer program, a controlled +1 gate to the register controlled by the ancilla qubit;

applying, by the quantum computer program, a second Hadamard gate to the ancilla qubit;

measuring, by the quantum computer program, a value of the ancilla qubit;

applying, by the quantum computer program, an inverse quantum Fourier transform to the register; and outputting, by the quantum computer program, a normal distribution, wherein the normal distribution comprises amplitudes of basis states of the plurality of qubits in the register.

2. The method of claim 1, wherein the state of the register is $$\cos\theta|x\rangle|0\rangle + \sin\theta|x\rangle|1\rangle$$

where $|x\rangle$ is the state of the register after the Y-Rotation operation.

3. The method of claim 1, wherein the state of the register and the ancilla qubit is:

$$\cos\theta|x\rangle|0\rangle + \sin\theta|x+1\rangle|1\rangle$$

after the application of the controlled +1 gate.

4. The method of claim 1, wherein the state of the register and the ancilla qubit is:

$$\frac{1}{\sqrt{2}}(\cos\theta|x\rangle|0\rangle + \sin\theta|x+1\rangle|0\rangle) + \frac{1}{\sqrt{2}}(\cos\theta|x\rangle|1\rangle - \sin\theta|x+1\rangle|1\rangle)$$

after the application of the first Hadamard gate.

5. The method of claim 1, wherein the steps of applying the Y-Rotation operation with the angle $\pi/2$ to the ancilla qubit, applying the controlled +1 gate to the register controlled by the ancilla qubit, applying the second Hadamard gate to the ancilla qubit, and measuring the ancilla qubit are repeated for the number of iterations.

6. The method of claim 1, wherein the plurality of qubits in the register are post-selected based on the measured values of the ancilla qubit.

7. A system comprising:
a quantum computer; and
a classical computer comprising a processor and a memory, wherein the classical computer causes the quantum computer to:
receive a mean, a standard deviation, and a discretization;
determine a number of iterations based on the mean and the standard deviation;
identify a first value from the discretization;
set a plurality of qubits in a register equal to the first value;
identify a value $X_0$ from the mean;
initialize a state of the plurality of qubits in the register and a state of an ancilla qubit to $|0\rangle$;
apply a first Hadamard gate to the plurality of qubits in the register;
apply a quantum Fourier transform to the register;
apply a $+X_0$ gate to the register;
apply a Y-Rotation operation with an angle $\pi/2$ to the ancilla qubit;
apply a controlled +1 gate to the register controlled by the ancilla qubit;
apply a second Hadamard gate to the ancilla qubit;
measure a value of the ancilla qubit;
apply an inverse quantum Fourier transform to the register; and
output a normal distribution, wherein the normal distribution comprises amplitudes of basis states of the plurality of qubits in the register.

8. The system of claim 7, wherein the state of the register is $$\cos\theta|x\rangle|0\rangle + \sin\theta|x\rangle|1\rangle$$

where $|x\rangle$ is the state of the register after the Y-Rotation operation.

9. The system of claim 7, wherein the state of the register and the ancilla qubit is $$\cos\theta|x\rangle|0\rangle + \sin\theta|x+1\rangle|1\rangle$$

after the application of the controlled +1 gate.

10. The system of claim 7, wherein the state of the register and the ancilla qubit is:

$$\frac{1}{\sqrt{2}}(\cos\theta|x\rangle|0\rangle + \sin\theta|x+1\rangle|0\rangle) + \frac{1}{\sqrt{2}}(\cos\theta|x\rangle|1\rangle - \sin\theta|x+1\rangle|1\rangle)$$

after the application of the first Hadamard gate.

11. The system of claim 7, wherein applying the Y-Rotation operation with the angle $\pi/2$ to the ancilla qubit, applying the controlled +1 gate to the register controlled by the ancilla qubit, applying the second Hadamard gate to the ancilla qubit, and measuring the ancilla qubit are repeated for the number of iterations.

12. The system of claim 7, wherein the plurality of qubits in the register are post-selected based on the measured values of the ancilla qubit.

\* \* \* \* \*